H. G. STEINBERG.
CAPSTAN DEVICE FOR MOTOR TRUCKS.
APPLICATION FILED JUNE 4, 1920.
1,378,734.
Patented May 17, 1921.
2 SHEETS—SHEET 1.
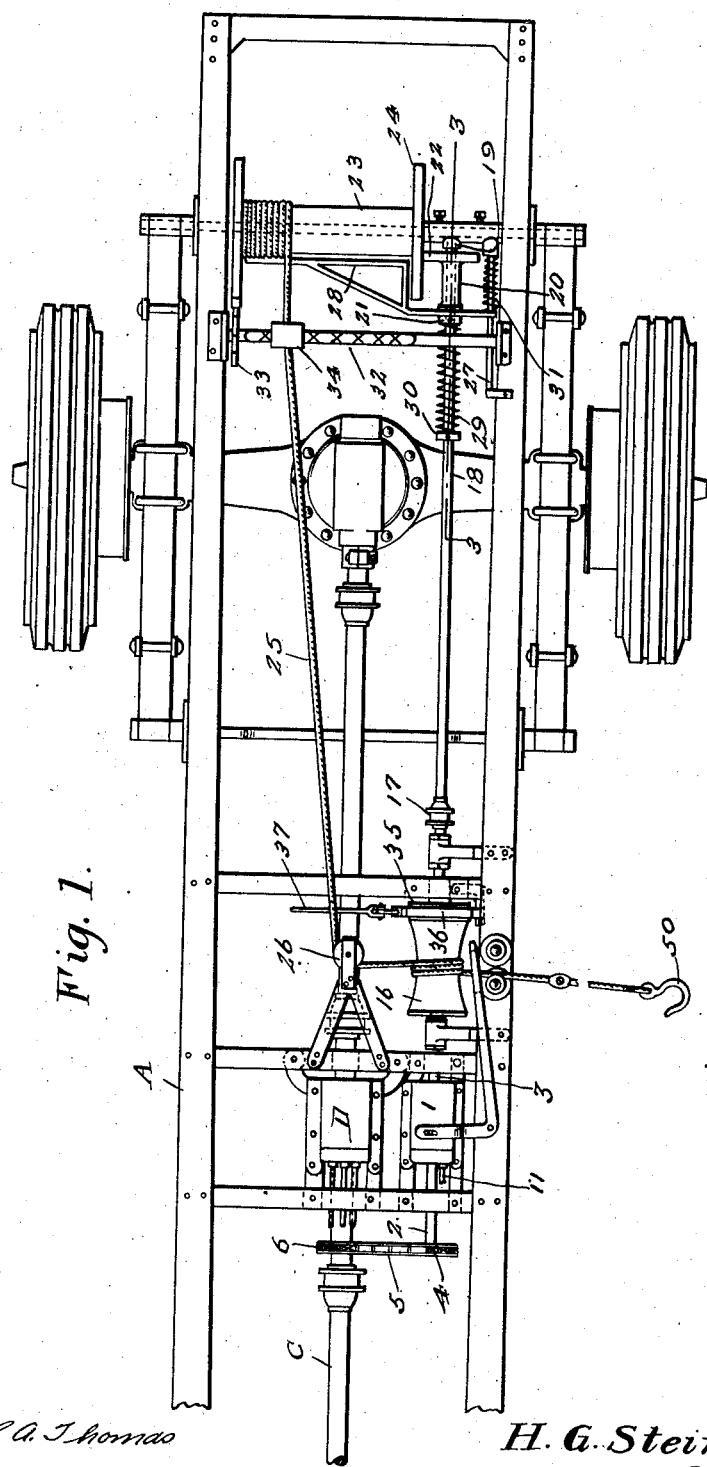
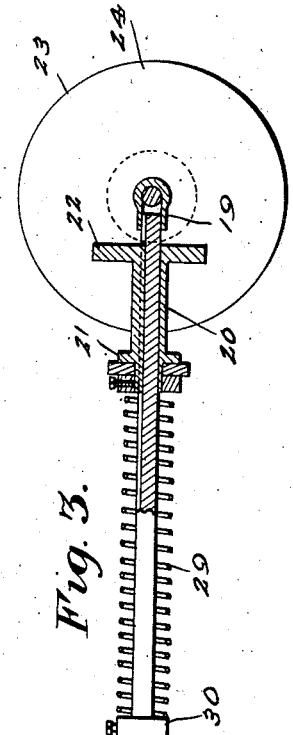
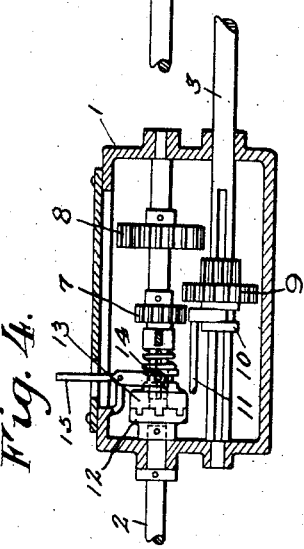
H. G. Steinberg INVENTOR
BY *Victor J. Evans*
ATTORNEY
WITNESSES H. G. STEINBERG.
CAPSTAN DEVICE FOR MOTOR TRUCKS.
APPLICATION FILED JUNE 4, 1920.
1,378,734.
Patented May 17, 1921.
2 SHEETS—SHEET 2.
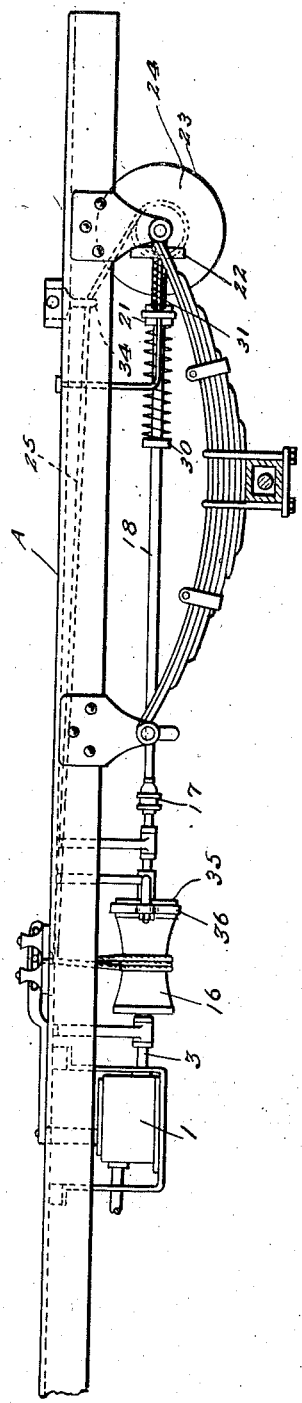
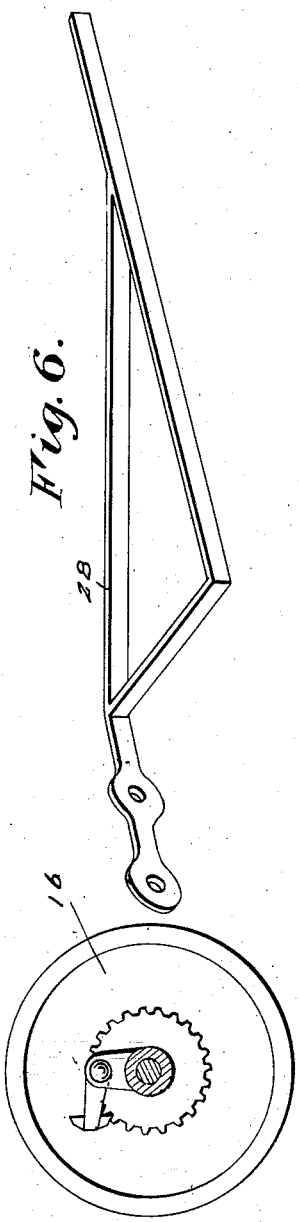
WITNESSES.
R. A. Thomas
H. G. Steinberg INVENTOR
BY Victor J. Evans
ATTORNEY

UNITED STATES PATENT OFFICE.

HENRY G. STEINBERG, OF MILWAUKEE, WISCONSIN.

CAPSTAN DEVICE FOR MOTOR-TRUCKS.

1,378,734. Specification of Letters Patent. Patented May 17, 1921.

Application filed June 4, 1920. Serial No. 386,557.

*To all whom it may concern:*

Be it known that I, HENRY G. STEINBERG, a citizen of the United States, residing at Milwaukee, in the county of Milwaukee and State of Wisconsin, have invented new and useful Improvements in Capstan Devices for Motor-Trucks, of which the following is a specification.

This invention relates to hoisting devices, particularly to an attachment for motor trucks, and has for its object the provision of a capstan structure adapted to be associated with and carried by the chassis of a motor vehicle whereby the motor truck may, by its own power, pull itself out of an excavation or the like even after being loaded.

An important object is the provision of a device of this character which is adapted to be driven by the transmission of the truck or the drive shaft by means of power take-off and which includes not only a capstan but also a winding drum upon which is wound, and from which is unwound, the cable, the capstan being driven by a variable speed transmission drive operated through the power take-off or truck transmission, the winding drum being driven by a friction drive device operated by the capstan and automatically controlled by a cross rod device operated over the core or cable on the drum, whereby the speed of winding or unwinding of the cable will be maintained constant.

Another object is the provision of a device of this character in which the winding drum has associated therewith an automatically operated guide for winding the cable evenly.

An additional object is the provision of a device of this character which will be comparatively simple and inexpensive in manufacture and installation, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a plan view of a motor truck chassis showing my device in position thereon, Fig. 2 is a side elevation, Fig. 3 is a detail longitudinal sectional view on the line 3—3 of Fig. 1, Fig. 4 is a longitudinal sectional view through the transmission gearing of the device, Fig. 5 is a sectional view illustrating the pawl and ratchet mechanism, Fig. 6 is a perspective view of the cable engaging arm.

Referring more particularly to the drawings, the letter A designates the chassis of a motor truck, B designates the body which is pivoted thereon in the usual manner, and C designates the drive shaft leading from the transmission case D.

In carrying out my invention I provide a special transmission casing 1 mounted upon the chassis and having journaled therein shafts 2 and 2ª arranged in end to end relation and a shaft 3 parallel therewith. The shaft 2 extends beyond one end of the casing 1 and carries a sprocket 4 engaged by a chain 5 trained over a sprocket 6 on the truck drive shaft C. Fixed upon the shaft 2ª are gears 7 and 8 with either of which may be meshed gears 9 splined upon the shaft 3 and having a grooved collar 10 engaged by a shifting lever 11. The shafts 2 and 2ª carry clutch members 12 and 13, respectively, the former of which is fixed and the latter of which is provided with a grooved collar 14 engaged by a lever 15.

Outwardly of the casing and intermediate its ends, the shaft 3 has secured thereon a capstan 16 and is connected at one end with a universal joint connection 17 which is in turn connected with a shaft 18 having its end journaled within a bearing 19 and having a hollow shaft member 20 slidable thereon. This hollow shaft 20 is provided at one end with a shifting collar 21 and at its other end with a friction pulley or wheel 22, for a purpose to be described.

Journaled upon the chassis at right angles to the shafts 3 and 18, is a winding drum 23 which is provided at one end with a friction disk 24 engaging the disk 22. A cable 25 is connected upon this drum 23 and passes over one or more guide rollers 26 and is wrapped about the capstan 16. The shaft of the drum 23 carries the bearing 19.

Mounted at one side of the frame is a bracket 27 upon which is slidable an arm 28 offset, as shown, to pass the disk 24 and this arm extends along the drum 23 in engagement with the coils of cable thereon. This arm is engaged with the grooved collar 21 and the collar and arm are urged toward the drum by a spring 29 encircling the shaft 18 and engaging a set collar 30. Another spring 31 engages the arm 28 and is carried by the bracket 27. This cross arm 28 bears against the convolutions of the cable upon the drum and is moved with respect to the core, depending upon the amount of cable or rather the number of layers thereof upon the drum. From this construction it will be seen that as the number of layers of cable upon the drum increases the sliding shaft 20 will be moved so that the drive disk 22 will be disposed farther from the center of the friction disk 24 so that the speed of rotation of the drum will be proportionately decreased so that the speed of winding of the cable will be uniform.

A suitable guide device is provided in association with the drum 23 and cable 25 for feeding the cable evenly onto the drum and the construction of this device may be conventional but is here shown as a shaft 32 formed with right and left spirals and driven by engagement with a connection 33 between it and the drum 23. The shaft 32 carries a cable engaging roller 34 which moves back and forth and feeds the cable evenly onto the drum.

Formed on one end of the capstan 16 is a brake drum 35 engaged by a suitable contractile band 36 having lever means 37 connected therewith whereby to contract it about the brake drum, this means being preferably connected with a suitable lever mounted adjacent the driver's seat. It is also preferable that the gear shift lever 11 and clutch lever 15 provided in association with the transmission gears of the device be connected with a suitable lever mounted adjacent the driver's seat so that the operation of the device may be readily controlled.

Secured upon the chassis at a suitable point, is a channeled guide member 40 which has a slot 41. Pivoted upon the underside of the body B is a curved guide bar 42 of a size and shape to slide within the channel 40 and this bar 42 has a rib 43 on its concave side fitting within the slot 41. On its convex side the bar 42 is provided with a groove 44 within which a cable 45 is fastened by a pin 46 or the like, at the end. The other end of the cable 45 passes over a roller 47 at the upper end of the guide 40 and over one or more guide rollers 48 to a suitable position on the chassis where an eyelet 49 at this end of the cable 45 may be engaged by a hook 50 on the free end of the cable 25.

In the operation of the device, when it is desired to elevate the body B for dumping purposes, the hook 50 on the cable 25 is engaged within the eyelet 49 on the cable 45. When the control lever 11 is operated to throw the desired one of the gears 9 in mesh with the gears 7 and 8 and the shaft 2 being in rotation through the chain and sprockets, the shaft 3 will be rotated as will also be the capstan 16 which will result in pulling upon the cable 25 and cable 45 which will cause the bar 42 to be pulled upwardly within the guides 40 and this will result in elevation of the body.

When it is desired to use the device for pulling the truck out of an excavation, up a steep incline, out of the mud, or drawing a heavy object onto the truck, it is necessary to engage the free end of the cable 25 with any convenient and suitable stationary object or to the object to be drawn. The control lever 11 is then operated to mesh one of the gears 9 with the gears 7 or 8. In pulling the truck the selected gears in the truck transmission are also put in mesh, it being understood that the truck motor must be in operation, this causing the truck to travel, and the capstan 16 to pull the cable 25, making it possible to get out of the most difficult conditions as the travel of the truck and the pull on the cable are uniform. In drawing an object onto the truck, the truck transmission is left inoperative so the truck will be stationary. The cable thus drawn in will be wrapped onto the drum 23 as the drum is rotated by the engagement of the disks 21 and 23. The speed control of the drum has already been described and further explanation should be unnecessary. When it is desired to let the truck descend slowly into an excavation or the like, the free end of the cable is secured to some suitable stationary support and the operation is the same except that the truck transmission is thrown into reverse gear. In this case the cable 25 is slowly paid out as the capstan operates and the truck may be thus permitted to descend slowly down an incline of such steepness that if descended in the ordinary manner could cause destruction of the truck.

It will of course be readily apparent that the device may be utilized for ordinary hoisting purposes in a manner which will readily suggest itself.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with the transmission of a motor truck, a hoisting device comprising a shaft having means whereby it may be driven from the transmission of the truck, a capstan carried by said shaft, a winding drum driven by said shaft and carrying a cable wrapped about the capstan, and automatic means for varying the speed of rotation of the drum in proportion to the number of layers of cable thereon, said means comprising a friction disk carried by one end of the drum, a shaft slidable on said first named shaft and in a plane at right angles thereto, and a spring-pressed member engaging the outermost layer of cable upon the drum and connected with said second named shaft whereby to shift the position of said second named disk with respect to the center of said first named disk.

2. In combination with the transmission of a motor truck, a hoisting device comprising a shaft journaled on the truck frame longitudinally thereof, a selective gear transmission mechanism connecting said shaft with the drive shaft of the truck, a capstan on said first named shaft, a winding drum journaled on the truck frame and provided with a friction disk, a second disk engaging said disk whereby to rotate the drum, a sleeve carrying said second named disk and slidable upon the first named shaft, a spring-pressed arm connected with said sleeve and disposed adjacent the periphery of the drum, and a cable secured at one end and wound upon said drum and having its intermediate portion trained about the capstan, said arm engaging the outermost layer of cable on the drum whereby to shift said second named disk to vary the rotation of the drum.

In testimony whereof I affix my signature

HENRY G. STEINBERG.